United States Patent
Chaudhuri et al.

(10) Patent No.: US 10,178,587 B2
(45) Date of Patent: Jan. 8, 2019

(54) SYSTEM AND METHOD FOR TRAFFIC OFFLOADING FOR OPTIMAL NETWORK PERFORMANCE IN A WIRELESS HETEROGENEOUS BROADBAND NETWORK

(71) Applicants: Saptarshi Chaudhuri, Bangalore (IN); Irfan Baig, Bangalore (IN); Guruprasad Irappa Naik, Bangalore (IN)

(72) Inventors: Saptarshi Chaudhuri, Bangalore (IN); Irfan Baig, Bangalore (IN); Guruprasad Irappa Naik, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/618,919

(22) Filed: Feb. 10, 2015

(65) Prior Publication Data
US 2016/0157131 A1    Jun. 2, 2016

(30) Foreign Application Priority Data
Dec. 2, 2014   (IN) .......................... 6052/CHE/2014

(51) Int. Cl.
*H04W 28/08* (2009.01)
*H04W 36/00* (2009.01)

(52) U.S. Cl.
CPC ....... *H04W 36/0055* (2013.01); *H04W 28/08* (2013.01)

(58) Field of Classification Search
CPC .................................................. H04W 28/085
(Continued)

(56) References Cited

U.S. PATENT DOCUMENTS 6,363,127 B1 *   3/2002   Heinonen .............. H03G 3/001
                                                                    375/345
7,289,921 B1 *  10/2007   Salmi ...................... G06F 1/08
                                                                    702/107
(Continued)

FOREIGN PATENT DOCUMENTS

CN           104144473 A        11/2014
GB           2512347            10/2014
(Continued)

OTHER PUBLICATIONS

TS 23.401 Release 8.10.0—General Packet Radio Service (GPRS) enhancements for Evolved Universal Terrestrial Radio Access Network, available at http://www.3gpp.org/ftp/Specs/archive/23_series/23.401/23401-8g0.zip, Mar. 2012 (238 pages).
(Continued)

*Primary Examiner* — Peter G Solinsky
(74) *Attorney, Agent, or Firm* — Finnegan, Henderson, Farabow, Garrett & Dunner LLP

(57) ABSTRACT

The present disclosure relates to systems, methods, and non-transitory computer-readable media for offloading data packets from a first radio access network to a second radio access network. The method comprises monitoring first values of first performance parameters of the first radio access network at different instants of time prior to a predetermined transmission time interval. Then the second values of the one or more first performance parameters are predicted based on the first values. Further, the second values are compared against corresponding predetermined threshold values of the one or more first performance parameters and based on the comparison offloading of the data packets are triggered.

25 Claims, 10 Drawing Sheets

(58) Field of Classification Search
USPC .......................................................... 370/238
See application file for complete search history.

(56) References Cited

U.S. PATENT DOCUMENTS

| | | | | |
|---|---|---|---|---|
| 8,391,150 | B2* | 3/2013 | Hong | H04W 28/0278 370/235 |
| 2003/0161355 | A1* | 8/2003 | Falcomato | H04J 3/0623 370/539 |
| 2004/0016430 | A1* | 1/2004 | Makinson | A61M 16/10 128/203.12 |
| 2011/0075557 | A1 | 3/2011 | Chowdhury et al. | |
| 2011/0317571 | A1 | 12/2011 | Kokkinen et al. | |
| 2012/0020216 | A1* | 1/2012 | Vashist | H04L 41/14 370/235 |
| 2012/0297055 | A9 | 11/2012 | Raleigh | |
| 2013/0124930 | A1* | 5/2013 | Deuri | H04L 63/1408 714/708 |
| 2013/0191317 | A1* | 7/2013 | Perron | G06N 5/00 706/50 |
| 2013/0311640 | A1* | 11/2013 | Gleixner | H04W 40/246 709/224 |
| 2013/0329552 | A1* | 12/2013 | Carnero Ros | H04L 47/127 370/230 |
| 2014/0003252 | A1* | 1/2014 | Johannes | H04L 12/2697 370/242 |
| 2014/0079022 | A1* | 3/2014 | Wang | H04W 36/22 370/331 |
| 2014/0092742 | A1* | 4/2014 | Chou | H04L 1/1864 370/235 |
| 2014/0161103 | A1* | 6/2014 | Sirotkin | H04W 24/10 370/332 |
| 2014/0200008 | A1* | 7/2014 | Wang | H04W 36/38 455/438 |
| 2014/0287743 | A1* | 9/2014 | Yeh | H04W 28/16 455/426.1 |
| 2014/0307550 | A1* | 10/2014 | Forssell | H04W 36/22 370/235 |
| 2015/0092553 | A1* | 4/2015 | Sirotkin | H04W 48/16 370/235 |
| 2015/0264597 | A1* | 9/2015 | Zhang | H04W 36/14 370/232 |
| 2015/0312829 | A1* | 10/2015 | Hu | H04W 28/16 370/230 |
| 2015/0319662 | A1* | 11/2015 | Enomoto | H04W 36/14 370/338 |
| 2015/0327110 | A1* | 11/2015 | Jeong | H04W 28/0215 370/338 |
| 2015/0358857 | A1* | 12/2015 | Duan | H04W 28/08 370/237 |
| 2015/0365868 | A1* | 12/2015 | Chang | H04W 48/18 370/230 |
| 2015/0382262 | A1* | 12/2015 | Cho | H04W 36/14 370/331 |
| 2016/0014667 | A1* | 1/2016 | Sirotkin | H04W 76/00 370/252 |
| 2016/0021025 | A1* | 1/2016 | Patel | H04L 47/823 370/329 |
| 2016/0029295 | A1* | 1/2016 | Nagasaka | H04W 48/18 370/237 |
| 2016/0050605 | A1* | 2/2016 | Kim | H04W 28/08 370/331 |
| 2016/0073297 | A1* | 3/2016 | Hwang | H04W 36/0011 370/331 |
| 2016/0088548 | A1* | 3/2016 | Zhao | H04W 24/02 455/422.1 |
| 2016/0119870 | A1* | 4/2016 | Chang | H04W 52/0212 455/426.1 |
| 2016/0127967 | A1* | 5/2016 | Liu | H04W 28/08 455/438 |
| 2016/0127988 | A1* | 5/2016 | Yao | H04W 48/18 370/338 |
| 2016/0183281 | A1* | 6/2016 | Yeh | H04W 28/24 370/332 |
| 2016/0198364 | A1* | 7/2016 | Schwarzbauer | H04W 28/08 370/331 |

FOREIGN PATENT DOCUMENTS

| | | |
|---|---|---|
| WO | WO 2012099541 | 7/2012 |
| WO | WO 2012/127280 A1 | 9/2012 |
| WO | WO 2012/166110 A1 | 12/2012 |
| WO | WO 2013050070 | 4/2013 |
| WO | WO 2013171365 | 11/2013 |

OTHER PUBLICATIONS

TS 36.321 3GPP MAC protocol specification, available at http://www.3gpp.org/ftp/Specs/archive/36_series/36.321/36321-8c0.zip, Mar. 2012 (215 pages).

TS 36.331 3GPP RRC protocol specifications, available at http://www3gpp.org/ftp/Specs/archive/36_series/36.331/36331-8h0.zip, Jun. 2012 (47 pages).

TS 23.402 Architecture enhancements for non-3GPP accesses, available at http://www.3gpp.org/ftp/Specs/archive/23_series/23.402/23402-a80.zip, Sep. 2012 (232 pages).

TS 24.312 Access Network Discovery and Selection Function (ANDSF) Management Object (MO), available at http://www.3gpp.org/ftp/Specs/archive/24_series/24.312/24312-c40.zip, Mar. 2014 (279 pages).

TS 23.327 Mobility between 3GPP—Wireless Local Area Network (WLAN) interworking and 3GPP systems, available at http://www.3gpp.org/ftp/Specs/archive/23_series/23.327/23327-b00.zip, Mar. 2012 (27 pages).

Extended European search report dated Apr. 6, 2016, from the European Patent Office in counterpart application No. EP 15 19 1705.

First Office Action issued by the Chinese Patent Office in related Foreign Application No. 201510845004.4; dated Jun. 28, 2018 (foreign and English-language version attached) (10 pgs.).

\* cited by examiner

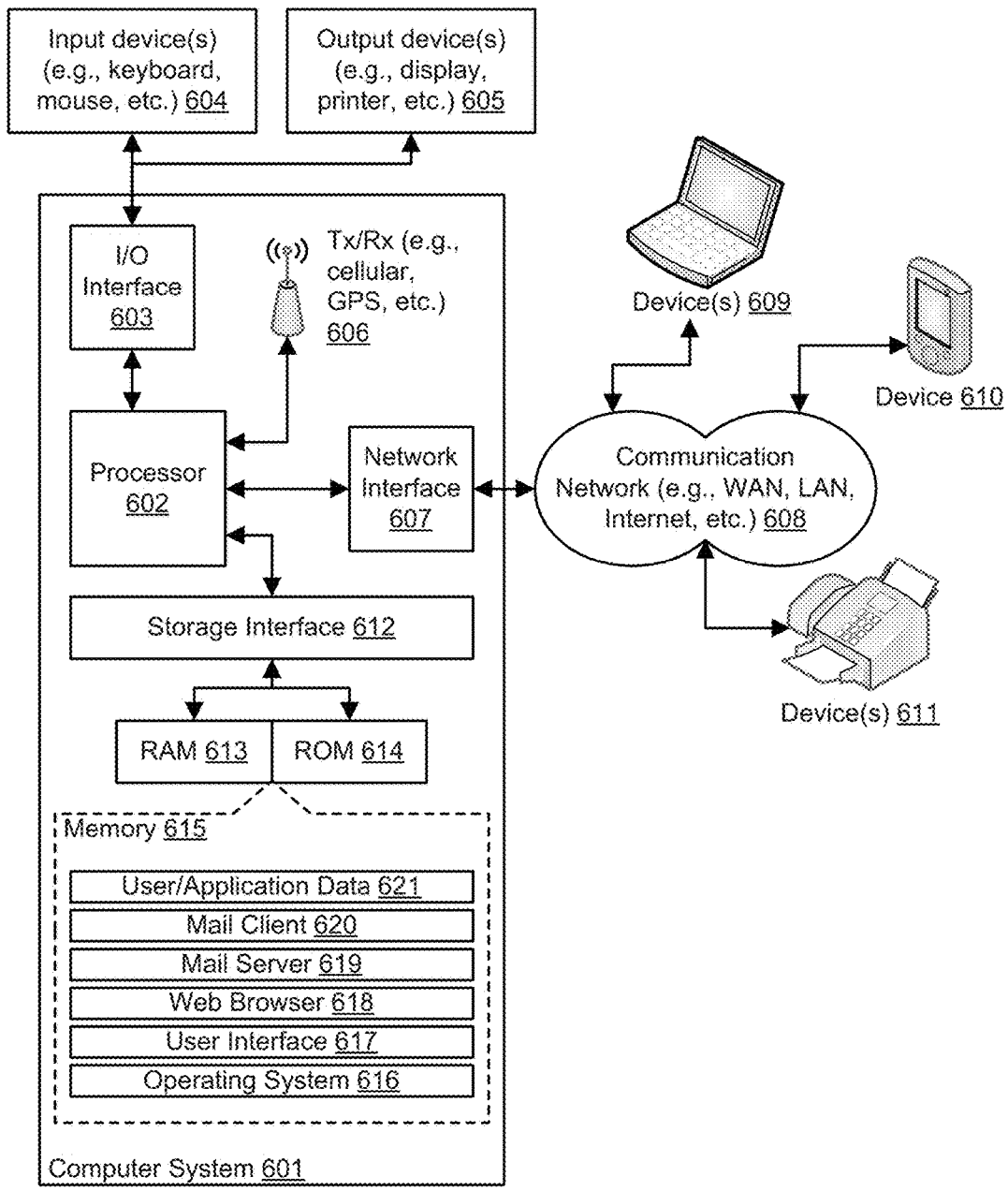
FIG. 6: Example Computer System

SYSTEM AND METHOD FOR TRAFFIC OFFLOADING FOR OPTIMAL NETWORK PERFORMANCE IN A WIRELESS HETEROGENEOUS BROADBAND NETWORK

PRIORITY CLAIM

This U.S. patent application claims priority under 35 U.S.C. § 119 to: India Application No. 6052/CHE/2014. The entire contents of the aforementioned application are incorporated herein by reference.

TECHNICAL FIELD

The present disclosure relates generally to offloading data, and more particularly but not limited to traffic offloading from a LTE (long term evolution) network to WLAN (wireless local area network) for optimizing network performance and optimizing resource utilization.

BACKGROUND

In present day scenario, rapid increase in mobile subscriber base and recent emergence of applications such as MMOG (multimedia online gaming), mobile TV, web 2.0, high definition video streaming, live meeting etc., have resulted in large scale increase of mobile data usage. This motivated $3^{rd}$ Generation Partnership Project (3GPP) to work on the standardization and development of the 3G Long-Term Evolution (LTE). LTE is an end to end broadband IP network that aims to provide high sector capacity, scalability, improve end-user throughputs, and reduce user plane latency and bringing significantly improved user experience with full mobility. The LTE architecture comprises of an evolved radio access network (EUTRAN) and an evolved packet core (EPC). 3GPP has listed a set of requirements that the LTE architecture should fulfill, including downlink and uplink peak data rates of 100 Mbits/s and 50 Mbits/s, respectively and enhanced multimedia broadcast multicast service (EMBMS) through paired and unpaired spectrum arrangements.

The increasing consumption of data by mobile device users running several high data rate applications with stringent QoS (Quality of Service) requirements has put forth lot of challenges on the cellular network operators. Some of the challenges that the operators shall be facing are summarized below:
1. Significant data traffic congestion at gateways and also in the base stations leading to increased queuing delays and packet drops finally degrades the QoS (quality of service).
2. High wear and tear of the hardware elements of the gateways and base stations causing early outage and hence degrades the QoS
3. High power consumptions and heat dissipation at the gateways and base stations leading to unnecessary system breakdowns which leads to degradation of the QoS.

Operators are attempting to address the above stated degradation of QOS challenges by upgrading their wide area networks (WANs) and deploying small cells. However in some scenarios these measures may not be sufficient.

In view of the above drawbacks, there is a need for a mechanism that reduces the load on the base stations and the gateways and optimizes the network (base stations and the gateways) performance (increased user throughput and decreased data latency) and resource utilization.

SUMMARY

Disclosed herein is a method for offloading one or more data packets from a first radio access network to a second radio access network. The method may include monitoring, by one or more hardware processors, first values of one or more first performance parameters of the first radio access network at one or more instants of time prior to a predetermined transmission time interval; predicting, by the one or more hardware processors, second values of the one or more first performance parameters based on the first values of one or more first performance parameters, the second values being predicted at the end of the predetermined transmission time interval; comparing, by the one or more hardware processors, the second values of the one or more first performance parameters to corresponding predetermined threshold values of the one or more first performance parameters; and triggering, by the one or more hardware processors, offloading of the one or more data packets from the first radio access network to the second radio access network based on the comparison.

In another aspect of the invention, a system for offloading one or more data packets from a first radio access network to a second radio access network is disclosed. The system may include one or more hardware processors; and a memory storing instructions that, when executed by the one or more hardware processors, cause the one or more hardware processors to perform operations. The operations may include monitoring, by one or more hardware processors, first values of one or more first performance parameters of the first radio access network at one or more instants of time prior to a predetermined transmission time interval; predicting, by the one or more hardware processors, second values of the one or more first performance parameters based on the first values of one or more first performance parameters, the second values being predicted at the end of the predetermined transmission time interval; comparing, by the one or more hardware processors, the second values of the one or more first performance parameters to corresponding predetermined threshold values of the one or more first performance parameters; and triggering, by the one or more hardware processors, offloading of the one or more data packets from the first radio access network to the second radio access network based on the comparison.

In yet another aspect of the invention, a non-transitory computer—readable medium storing instructions for offloading one or more data packets from a first radio access network to a second radio access network is disclosed. The instructions when executed by a processor cause the processor to perform operations. The operations may include monitoring first values of one or more first performance parameters of the first radio access network at one or more instants of time prior to a predetermined transmission time interval; predicting, by the processor, second values of the one or more first performance parameters based on the first values of one or more first performance parameters, the second values being predicted at the end of the predetermined transmission time interval; comparing the second values of the one or more first performance parameters to corresponding predetermined threshold values of the one or more first performance parameters; and triggering offloading of the one or more data packets from the first radio access network to the second radio access network based on the comparison.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

BRIEF DESCRIPTION OF THE DRAWINGS

The accompanying drawings, which constitute a part of this specification, illustrate several embodiments and, together with the description, serve to explain the disclosed principles. In the drawings:

FIG. 6 is a block diagram of an exemplary computer system for implementing embodiments consistent with the present disclosure.

DETAILED DESCRIPTION

As used herein, reference to an element by the indefinite article "a" or "an" does not exclude the possibility that more than one of the element is present, unless the context requires that there is one and only one of the elements. The indefinite article "a" or "an" thus usually means "at least one." The disclosure of numerical ranges should be understood as referring to each discrete point within the range, inclusive of endpoints, unless otherwise noted.

As used herein, the terms "comprise," "comprises," "comprising," "includes," "including," "has," "having," "contains," or "containing," or any other variation thereof, are intended to cover a non-exclusive inclusion. For example, a composition, process, method, article, system, apparatus, etc. that comprises a list of elements is not necessarily limited to only those elements but may include other elements not expressly listed. The terms "consist of," "consists of," "consisting of," or any other variation thereof, excludes any element, step, or ingredient, etc., not specified. The term "consist essentially of," "consists essentially of," "consisting essentially of," or any other variation thereof, permits the inclusion of elements, steps, or ingredients, etc., not listed to the extent they do not materially affect the basic and novel characteristic(s) of the claimed subject matter.

The present disclosure discloses an intelligent traffic offloading mechanism that takes into account the network configuration parameters and current and future performance parameters of the LTE network for triggering offloading of data, selection of appropriate network to offload for effective offloading keeping in mind the optimized network performance and resource utilization in a dynamic traffic load scenario across the networks (LTE & WLAN). The triggering is based on the current load (for example, number of active sessions) on source network (LTE) using network configuration parameters (for example maximum number of allowed active sessions). In some embodiments, the triggering is based on performance threshold of predicted performance of immediate future (t+1) of the source network (LTE) before offloading, based on network parameters like physical resource block (PRB) utilization, average inter scheduling interval, interference/noise power level, average packet discard rate, etc. Further, the selection of the appropriate target network (WLAN) is based on the user perceived signal strength and interference/noise power level of the target network (WLAN).

Figure 1:
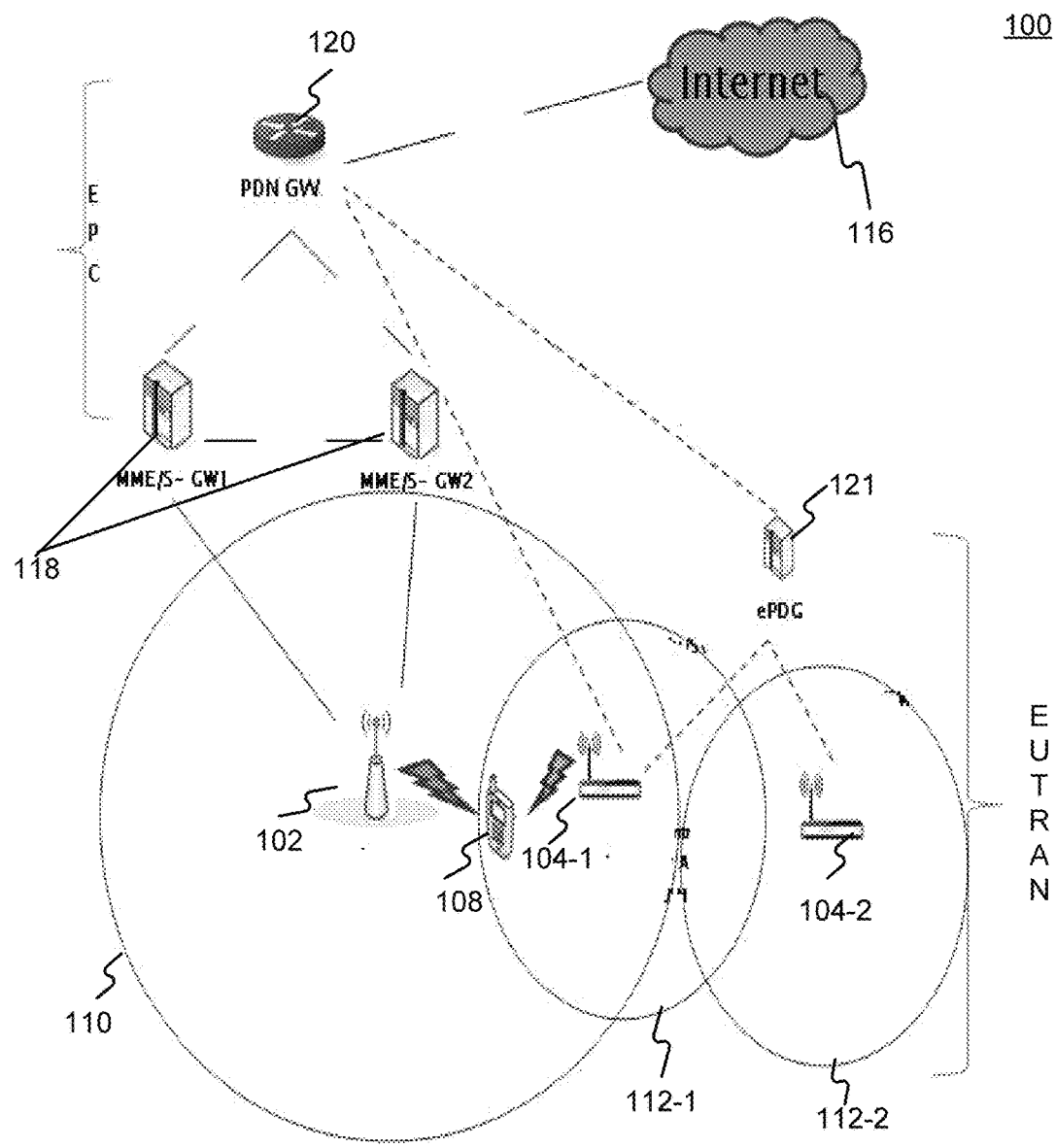
FIG. 1 illustrates an exemplary wireless communication system for implementing methods and systems consistent with the present disclosure.

FIG. 1 illustrates an exemplary wireless communication system 100 for implementing methods and systems consistent with the present disclosure. The wireless communication system 100 shown in FIG. 1 includes at least one base station 102 and one or more WLAN (wireless local area network) access points 104-1, 104-2 (collectively referred to as 104). In the example of FIG. 1, the at least one base station is shown as evolved NodeBs (eNB) 102. Base station is a node that can relay signals for mobile devices, also referred to herein as an user equipment UE 108. The term "base station" (BS) can be interchangeably used with a network node, an access node, or a network component.

The exemplary wireless communication system 100 may include a first radio access network 110/first cell and one or more second radio access networks/second cells 112-1, 112-2 (collectively referred to as 112), evolved packet core (EPC) networks 114, and external networks 116. The first radio access network 110 and the one or more second radio access networks 112 may constitute Evolved Universal Terrestrial Radio Access networks (EUTRANs). In certain implementations, the first radio access network 110 may be a Long-Term Evolution (LTE) wireless communication network. The one or more second radio access networks 112 may be WLAN networks that may include IEEE802.11 WLAN, IEEE802.16 WiMAX network, etc. Further, as shown, the UE 108 operates within the overlapping region of the first radio access network 110 and the one or more second radio access networks 112. As shown, UE 108 may be served by both eNB 102 and WLAN access point 104. In some implementations, 2G/3G systems, Global System for Mobile Communication (GSM), Interim Standard 95 (IS-95), Universal Mobile Telecommunications systems (UMTS) and/or Code Division Multiple Access (CDMA2000) may also be integrated into first radio access network 110.

Further, the first cell 110 may be service area of eNB 102 and one or more second cells 112 may be the service area of the one or more WLAN (wireless local area network) access points 104-1, 104-2 (collectively referred to as 104). WLAN networks may be trusted or untrusted networks. The first cell 110 and the one or more second cells 112 may overlap. The eNB 102 may include a processing module. The processing module may include one or more processing components (alternatively referred to as "processors" or "central processing units" (CPUs)) operable to execute instructions related to one or more of the processes, steps, or actions described in connection with one or more of the embodiments disclosed herein. The processing module may include other auxiliary components, such as random access memory (RAM), read only memory (ROM), secondary storage (for example, a hard disk drive or flash memory). Additionally, the processing module may execute certain instructions and commands to provide wireless or wired communication, using a wired communication subsystem or a wireless communication subsystem of the eNB.

The UE 108 may be any wireless electronic device used by an end-user to communicate, for example, within the wireless communication system 100. The UE 108 may transmit voice, video, multimedia, text, web content and/or any other user/client-specific content. The transmission of some contents, e.g., video and web content, may require high channel throughput to satisfy the end-user demand. The UE 108 may generate requests, send responses or otherwise communicate in different means with Evolved Packet Core (EPC) 114 and/or Internet Protocol (IP) networks 116 through the eNBs 102. Examples of UE include, but are not limited to, a mobile phone, a smart phone, a telephone, a television, a remote controller, a set-top box, a computer monitor, a computer (including a tablet computer, a desktop computer, a handheld or laptop computer, a netbook computer), a personal digital assistant (PDA), etc.

The EPC may include one or more mobility management entities (MME)/a serving gateways (SGW) 118, and a packet data network gateway (PGW) 120. The PGW 120 may provide connectivity to the services domain comprising external networks 116, such as the IP networks. The PGW 120 may control data traffic flowing to the eNB 102 and the WLAN access points 104-1, 104-2 (collectively referred to as 104). Finally, the data traffic is transmitted to UE 108. So, the PGW 120 is in a position to control the offloading of the data traffic from the eNB 102 to the WLAN access points 104-1, 104-2 (collectively referred to as 104). or vice versa.

As per 3GPP standard, in case of a trusted network scenario, the WLAN access points 104-1, 104-2 (collectively referred to as 104) are directly controlled by the PGW 120. And in case of un-trusted WLANs, evolved packet data gateway (ePDG) 121 acts as the aggregation point for all WLANs. The PGW (PDN GW) 120 is the main network component responsible for controlling the offloading mechanism in the LTE network and hence in the WLAN as well. Offloading of the data traffic may be one of the core functionality of the PGW 120. The PGW 120 may include a processing module. The processing module may include one or more processing components (alternatively referred to as "processors" or "central processing units" (CPUs)) operable to execute instructions related to one or more of the processes, steps, or actions described in connection with one or more of the embodiments disclosed herein. The processing module may include other auxiliary components, such as random access memory (RAM), read only memory (ROM), secondary storage (for example, a hard disk drive or flash memory).

Figure 2:
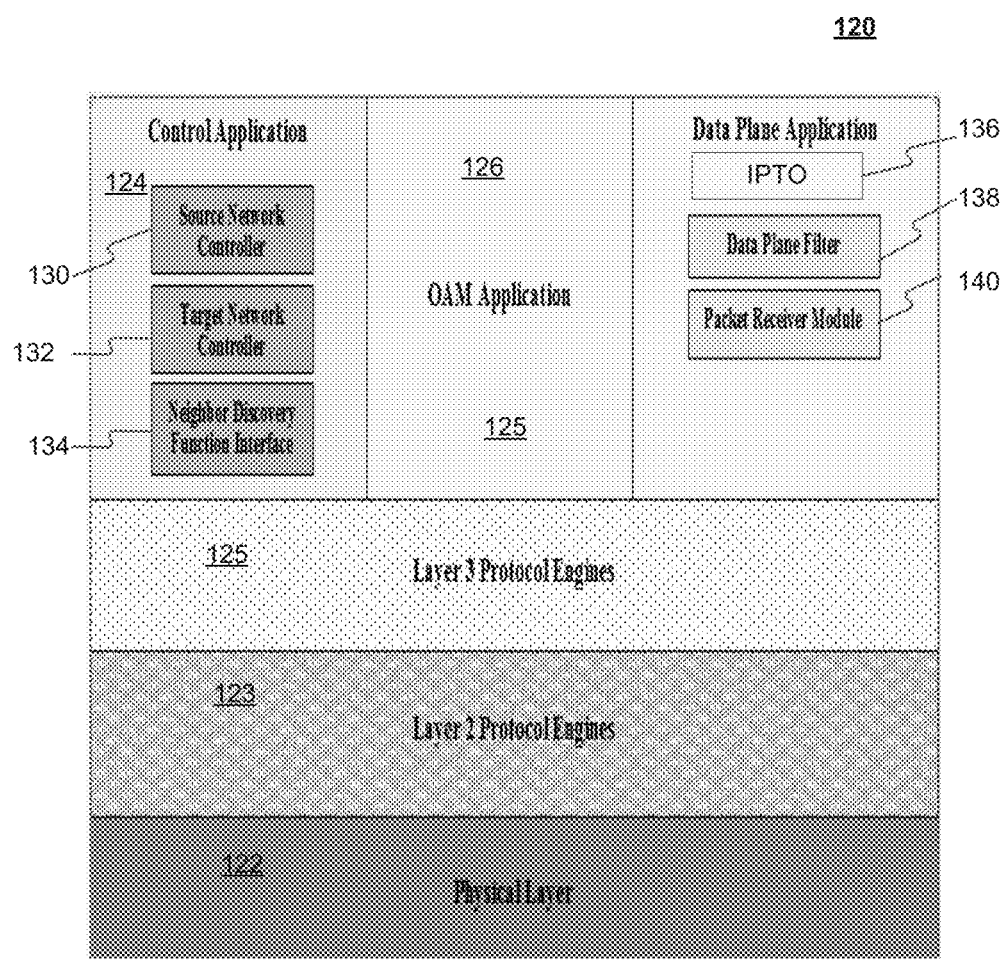
FIG. 2 illustrates an improved architecture of packet gateway (PGW) incorporating intelligent predictive traffic offloader (IPTO) in accordance with some embodiment of the present disclosure.

FIG. 2 illustrates an improved architecture of the PGW 120 in accordance with some embodiment of the present disclosure. The PGW 120 may include a physical layer 122, layer 2 protocol engines 123, layer 3 protocol engines 125, control application 124, OAM (operation and maintenance) application 126, and data plane application 128. Further, the control application 124 may include a source network controller 130, a target network controller 132, and a neighbor discovery function module 134. The source network controller 130 may control the functionalities of the eNB 102. The target network controller 132 may control the functionalities of the one or more WLAN access points 104-1, 104-2 (collectively referred to as 104). The neighbor discovery module 134 may discover the WLAN access points nearest to the eNB 102 based at least on received signal strength.

Further, the data plane application 128 may include intelligent predictive traffic offloader (IPTO) 136, a data plane filter 138, and a packet receiver module 140. The data plane filter 138 may be responsible for filtering the data packets received from external networks 110. The packet receiver module 140 may receive incoming data packets and forwards them to the data plane filter 138 for filtering.

Figure 3:
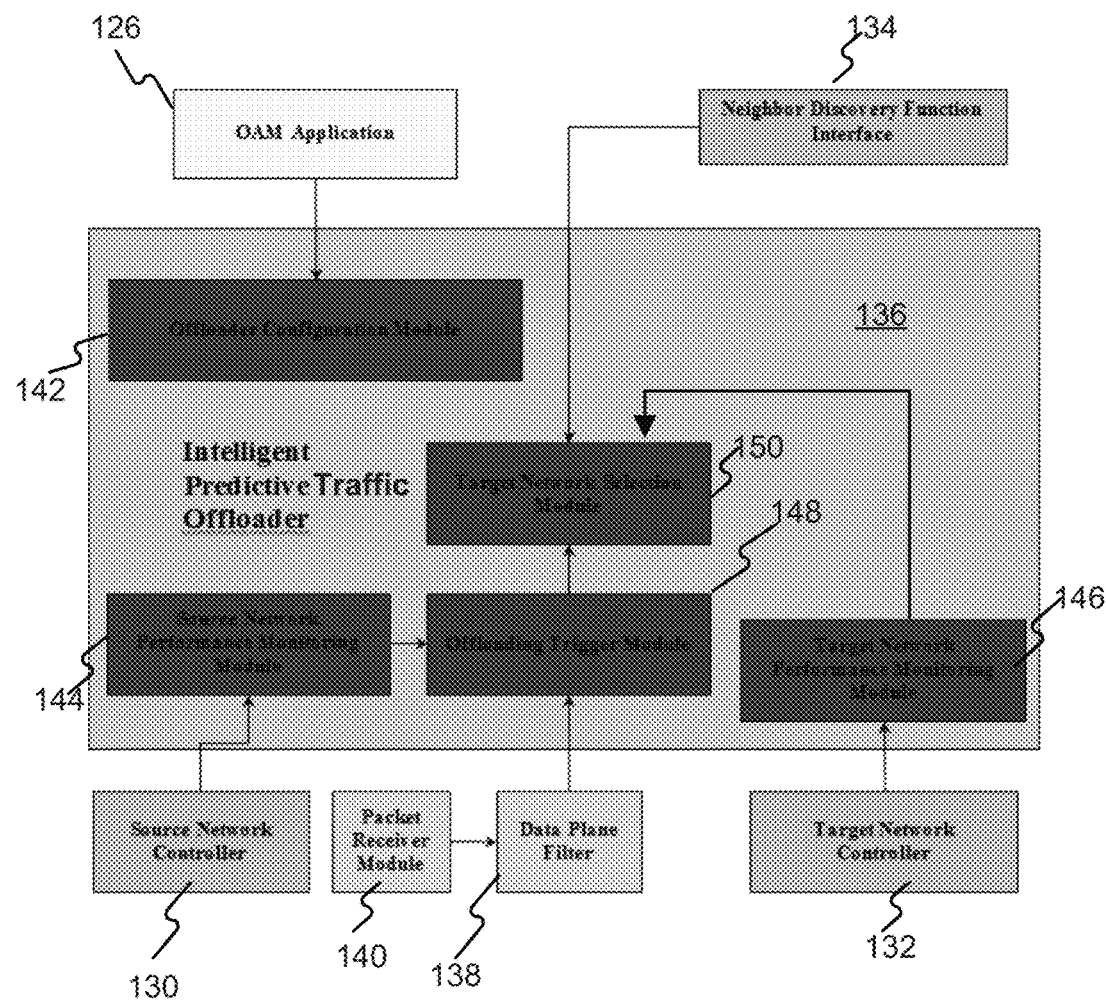
FIG. 3 illustrates system architecture of the intelligent predictive traffic offloader (IPTO) in accordance with some embodiments of the present disclosure.

FIG. 3 illustrates system architecture of the intelligent predictive traffic offloader (IPTO) 132 in accordance with some embodiments of the present disclosure. The IPTO 134 may include an offloader configuration module (OCM) 142, a source network performance monitoring module (SNPMM) 144, a target network performance monitoring module (TNPMM) 146, an offloading trigger module (OTM) 148, a target network selection module (TNSM) 150. The IPTO 132 is in electronic communication with the OAM application 126, the neighbor discovery function module (NDFM) 134, the source network controller (SNC) 130, the target network controller (TNC) 132, the data plane filter 138. Further, the source network controller 130 is communicatively coupled to the source network performance monitoring module 144. The target network controller 132 is communicatively coupled to the target network performance monitoring module 146. Firstly, The OAM application 126 provides one or more configuration parameters to the offloader configuration module 142 in order to initialize the IPTO 132. The offloader configuration module 142 stores the one or more configuration parameters. Some of the illustrative examples of the one or more configuration parameters are as follows:

MAXIMUM NUMBER OF ACTIVE FLOWS PER SERVICE TYPE FOR A CELL—$\eta_{SERVICE}^{MAX}$. This defines the maximum number of active sessions of a particular service type for a cell. This parameter may be used in the offloading trigger module 148.

MAXIMUM PAST PERFORMANCE STEP INTERVAL—$\lambda_{MAX}$. This defines the maximum past time interval for which the performance is to be considered for triggering an offload decision. This parameter may be used in the offloading trigger module 148.

MAXIMUM VALUE OF THE PERFORMANCE PARAMETERS—$\Psi_{MAX}$. This defines the maximum value of a performance parameter. This parameter may be used in offloading trigger module 148.

MAX INTERFERENCE/NOISE POWER LEVEL OF TARGET NETWORK—$\alpha_{MAX}$ This defines the maximum Interference/Noise power level of the target network. This parameter shall be used in the target network selection module 150.

MINIMUM PERCIEVED SIGNAL STREGTH BETWEEN USER AND TARGET NETWORK—$\beta_{MIN}$ This defines the minimum perceived signal strength between UE 108 and a target network, the target network being one of the one or more second radio access networks 112. This parameter may be used in the target network selection module 150.

The source network performance monitoring module (SNPMM) 144 may dynamically monitor performance of the first radio access network (LTE) 110. The SNPMM 144 may obtain the following performance statistics from the source network controller 130 that controls the functionalities of the eNB 102.

1. The number of active sessions of all the service types in the source network. Service types pertain to multimedia online gaming, high definition video buffering, live meeting, file sharing, web browsing etc.
2. The (Physical Resource Block) PRB utilization in the source network. This means that the performance of the eNB 102 may be optimized. The eNB 102 should not work to its fullest potential. If the eNB 102 is working at its maximum capacity, it may lead to the wear and tear of the hardware components of the eNB 102, thereby resulting in the degradation of the QOS.
3. The Interference/Noise power level at the serving eNB 102 in the first radio access network 110.
4. The average inter scheduling interval at the serving eNB 102 in the first radio access network 110.
5. The average packet discard rate at the serving eNB 102 due to traffic congestion in the first radio access network 110.

The SNPMM 144 stores these statistics in its internal database for use by the offloading trigger module.

The offloading trigger module (OTM) 148 may be responsible for triggering an offload decision based on the performance statistics of the SNPMM 144. The OTM 148 may decide whether to offload the data traffic or not. The OTM 148 may receive the data packets from the data plane filter 138. The OTM 148 may also fetch the configuration parameters from the OCM 142. The OTM 148 may take a decision on whether to offload this traffic or not. The OTM 148 may forward the offload decision to the target network selection module 150.

The TNSM 150 may be responsible for selecting an appropriate target network. The TNSM 150 may fetch the offload decision from the OTM 148. The TNSM may fetch the data flow to be offloaded from the source network controller (SNC) 130. The TNSM 150 may fetch a list of the potential target radio access networks for the data flow from the neighbor discovery function module 134. The TNSM 150 may also fetch the configuration parameters from the OCM 142. The TNSM 150 may then decide the appropriate target network and offloads the traffic to the selected network through the target network controller 132.

The TNPMM 146 may be responsible for dynamically monitoring the performance of the target network. As explained earlier, the target network is one of the one or more second radio access network 112. The TNPMM 146 may interact with the target network controller 132 and fetch the performance parameters (Interference/Noise Power level and UE perceived signal strength) of the target network.

Figure 4A:
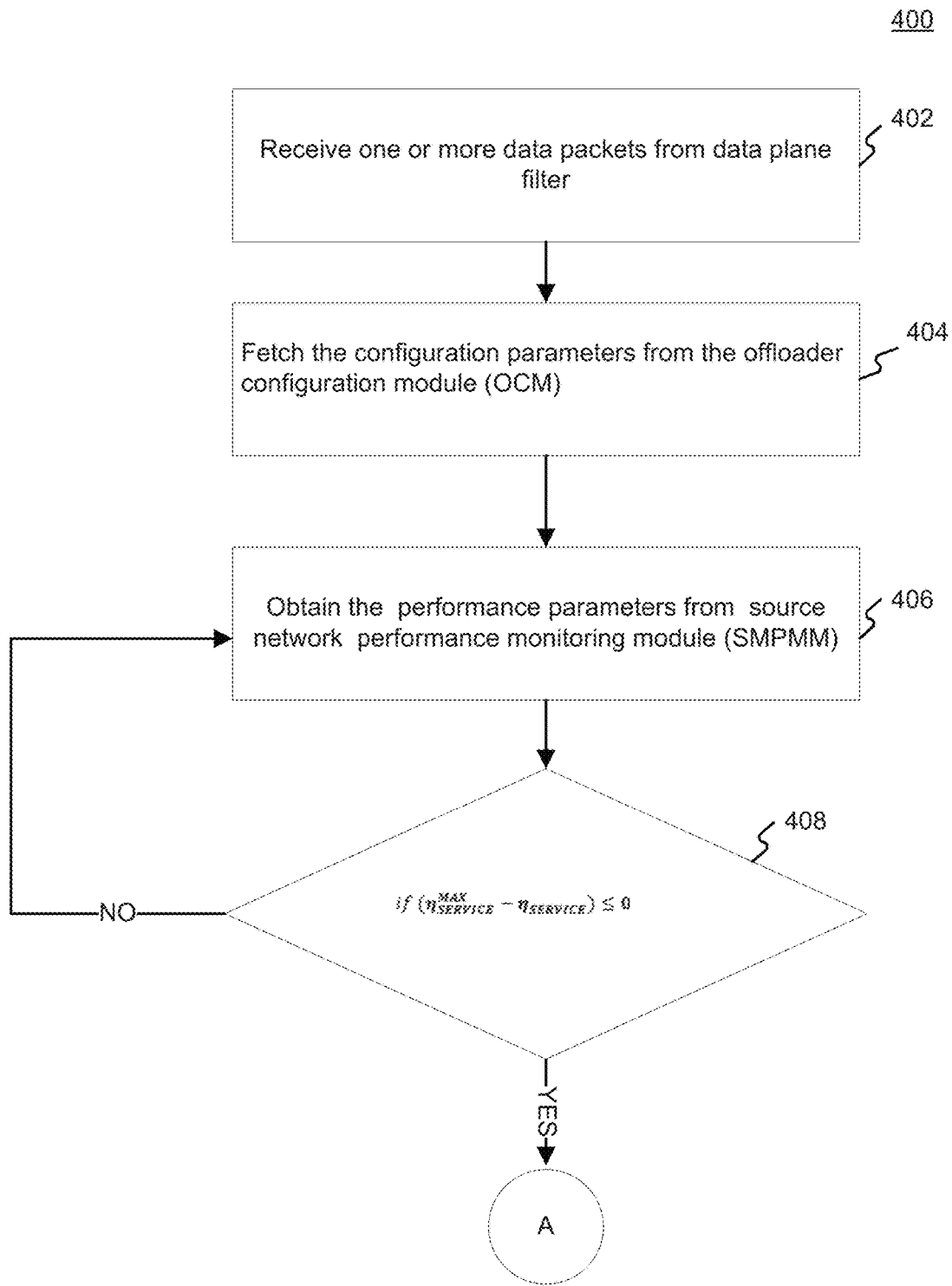
FIGS. 4A-B illustrate a flowchart of an exemplary method for offloading the data traffic from the first radio access network to one of the one or more second radio access network in accordance with an embodiment of the present disclosure.
Figure 4B:
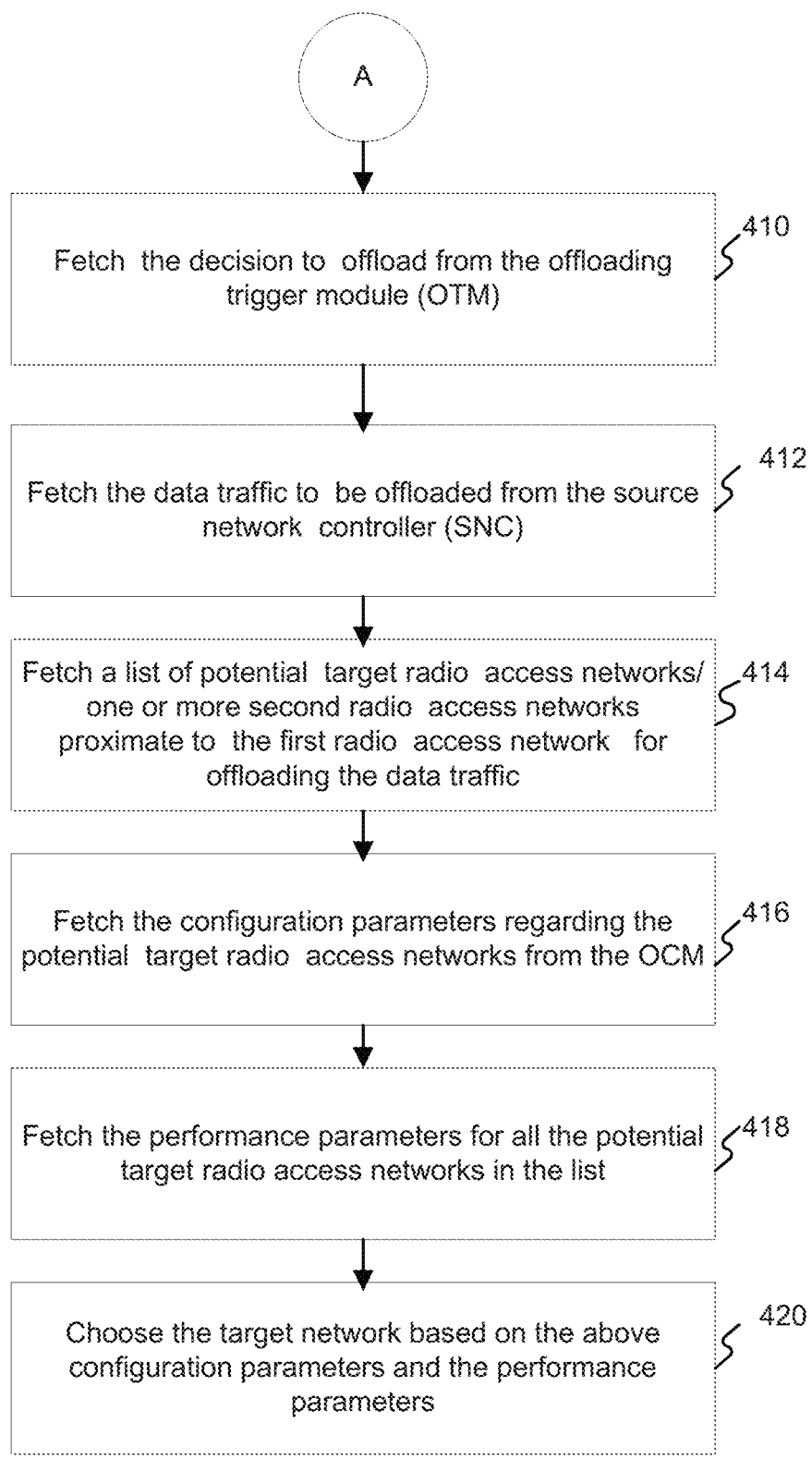

FIGS. 4A-B illustrate a flowchart 400 of an exemplary method for offloading the data traffic from the first radio access network 110 to one of the one or more second radio access network 112 in accordance with an embodiment of the present disclosure. The one of the one or more radio access networks may be the target network. The exemplary method is explained in conjunction with the FIG. 3.

With reference to FIG. 4A, at step 402, one or more data packets from the data plane filter 138 may be received by the OTM 148 through a communication interface or in-memory data sharing. The OTM 148 may identify the service type of the one or more data packets from the QCI field of the data packet.

At step 404, the OTM 148 may fetch the configuration parameters from the OCM 142. The configuration parameters are adaptive in nature and may be changed according to the network behavior. Some of the illustrative configuration parameters are as follows:
  i. MAXIMUM NUMBER OF ACTIVE FLOWS FOR THE DETERMINED SERVICE TYPE FOR A CELL—$\eta_{SERVICE}^{MAX}$
  ii. MAXIMUM PAST PERFORMANCE STEP INTERVAL—$\lambda_{MAX}$
  iii. MAXIMUM VALUE OF THE PERFORMANCE PARAMETERS—$\Psi_{MAX}$
  iv. MEASUREMENT TOLERANCE—$\Delta_{Tolerance}$
  v. MAXIMUM PENALTY VALUE—$\rho_{MAX}$
  vi. PENALTY HYSTERESIS—$\pi_{HYST}$ At step 406, the OTM 148 may obtain the following performance parameters from the SNPMM 144. Some of the illustrative performance parameters are as follows:
  a. The number of active sessions of all the service types in the first radio access network 110 ($\eta_{SERVICE}$).
  b. The (Physical Resource Block) PRB utilization in the first radio access network 110.
  c. The Interference/Noise power level at the serving eNB in the first radio access network 110.
  d. The average inter scheduling interval at the serving eNB in the first radio access network 110.
  e. The average packet discard rate at the serving eNB in the first radio access network 110.

These performance parameters are fetched on a regular basis.

At step 408, a decision to offload the traffic or not is taken based on the following exemplary condition:

$$\text{if } (\eta_{SERVICE}^{MAX} - \eta_{SERVICE}) \leq 0$$

If the condition is true, the offloading flag is set to be true, i.e., offload=true else offload=false, in case of true outcome, the method jumps to step 410 (see FIG. 4B) where the TNSM may fetch the decision to offload from the OTM 148. In case of false outcome, the method goes back to step 406. It would be apparent to a person skilled in the art that the performance parameters other than $\eta_{SERVICE}$ may be taken into consideration to make a decision to offload the traffic or not. The performance parameters may be compared against their respective performance parameters with the maximum value obtained from OCM 142.

At step 412, the TNSM 150 fetches the data traffic to be offloaded from the SNC 130.

At step 414, the TNSM 150 may fetch a list of one or more second radio access networks 112 proximate to the first radio access network 110 for offloading the data traffic. These one or more second radio access networks may also be referred to as potential target radio access networks. The list of the one or more second radio access networks may be obtained from the NFDM 134.

At step 416, fetch the configuration parameters regarding the potential target radio access networks from the OCM 142. The configuration parameters may be fetched by the TNSM 150. Some of the exemplary configuration parameters are as follows:
  MINIMUM PERCIEVED SIGNAL STREGTH BETWEEN USER AND TARGET NETWORK, the target network being one of the one or more second radio access networks 112—β_MIN
  MAX INTERFERENCE/NOISE POWER LEVEL OF TARGET NETWORK—α_MAX At step 418, fetch the performance parameters for all the potential target radio access networks in the list. The performance parameters may be fetched by the TNSM 150. Some of the exemplary performance parameters are as follows:
  a. User Perceived signal strength of the target network.
  b. Interference/Noise power level for each of the target network.

At step 420, choose the target network based on the above configuration parameters and the performance parameters.

In one implementation, the potential target radio access networks list may be sorted in descending order with respect to user perceived signal strength of the potential target radio access networks and chooses the target network with best perceived signal strength. That is signal strength greater than $\beta_{MIN}$.

In case of multiple potential target radio access networks having better perceived signal strength the Interference/Nose power level for each of the potential target radio access networks may be determined.

The target network with least Interference/Noise power level is chosen. That is less than $\alpha_{MAX}$. The data traffic is then offloaded to the target network.

FIGS. 5A-D illustrate a flowchart 500 of an exemplary method for offloading the data traffic from the first radio access network 110 to one of the one or more second radio access network 112 in accordance with another embodiment of the present disclosure. The one of the one or more radio access networks may be the target network. The exemplary method is explained in conjunction with the FIG. 3.

Figure 5A:
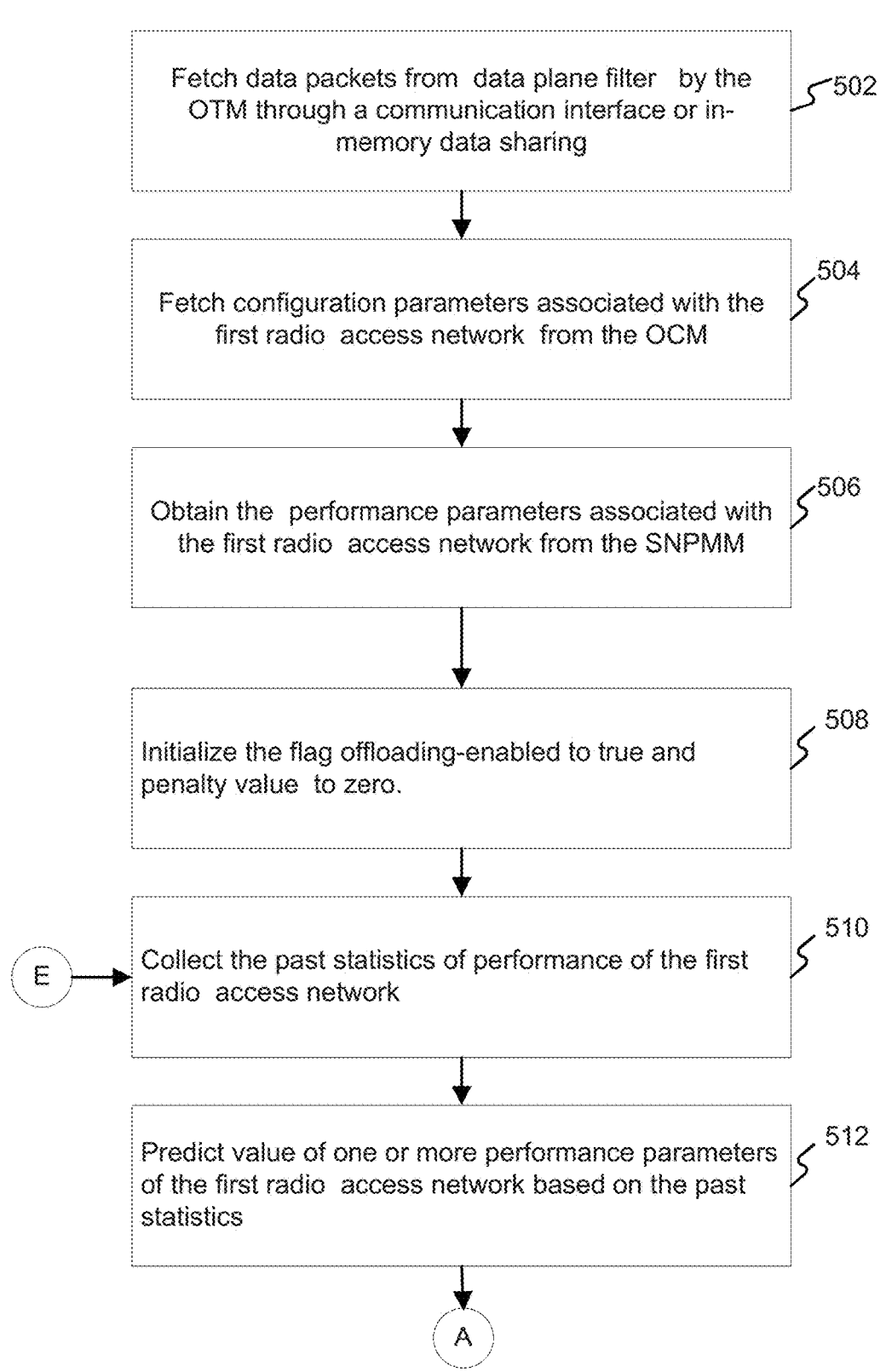
FIGS. 5A-D illustrate a flowchart of an exemplary method for offloading the data traffic from the first radio access network to one of the one or more second radio access network in accordance with another embodiment of the present disclosure.

With reference to FIG. 5A, at step 502, one or more data packets from the data plane filter 138 may be received by the OTM 148 through a communication interface or in-memory data sharing. The OTM 148 may identify the service type of the one or more data packets from the QCI field of the data packet.

At step 504, the OTM 148 may fetch the configuration parameters associated with the first radio access network 110 from the OCM 142. The configuration parameters are adaptive in nature and may be changed according to the network behavior. Some of the illustrative configuration parameters are as follows:
 a. MAXIMUM NUMBER OF ACTIVE FLOWS FOR THE DETERMINED SERVICE TYPE FOR A CELL—$\eta_{SERVICE}^{MAX}$
 b. MAXIMUM PAST PERFORMANCE STEP INTERVAL—$\lambda_{MAX}$
 c. MAXIMUM VALUE OF THE PERFORMANCE PARAMETERS—$\Psi_{MAX}$
 d. MEASUREMENT TOLERANCE—$\Delta_{Tolerance}$
 e. MAXIMUM PENALTY VALUE—$\rho_{MAX}$
 f. PENALTY HYSTERESIS—$\pi_{HYST}$ At step 506, the OTM 148 may obtain the following performance parameters from the SNPMM 144. Some of the illustrative performance parameters are as follows:
 a. The number of active sessions of all the service types in the first radio access network 110 ($\eta_{SERVICE}$).
 b. The (Physical Resource Block) PRB utilization in the first radio access network 110.
 c. The Interference/Noise power level at the serving eNB in the first radio access network 110.
 d. The average inter scheduling interval at the serving eNB in the first radio access network 110.
 e. The average packet discard rate at the serving eNB in the first radio access network 110.
 These performance parameters are fetched on a regular basis according to some timer.

At step 508, initialize the flag offloading-enabled to true and penalty value ρ to zero.

At step 510, collect the past statistics of performance of the first radio access network 110. In one implementation, the past statistics of the performance parameters of the first radio access network 110 are collected till $\lambda_{MAX}$, i.e., at time t, the performance parameters are collected till t−$\lambda_{MAX}$ as $\{v_1(t-1), v_2(t-2) \ldots v_n(t-\lambda_{MAX})\}$, where $v_i$ corresponds to value at $i^{th}$ time.

The network performance parameter can be one or combination of the,
 a) The (Physical Resource Block) PRB utilization.
 b) The Interference/Noise power level at the serving eNB.
 c) The average inter scheduling interval at the serving eNB.
 d) The average packet discard rate at the serving eNB.

At step 512, value of one or more performance parameters of the first radio access network 110 are predicted. At time t, based on the past performance of the performance parameter, value of the performance parameter is predicted $v(t)_{predicted}$. The prediction can be based on any of the exemplary techniques, i.e., machine learning, reinforcement learning, and cognitive modelling.

Figure 5B:
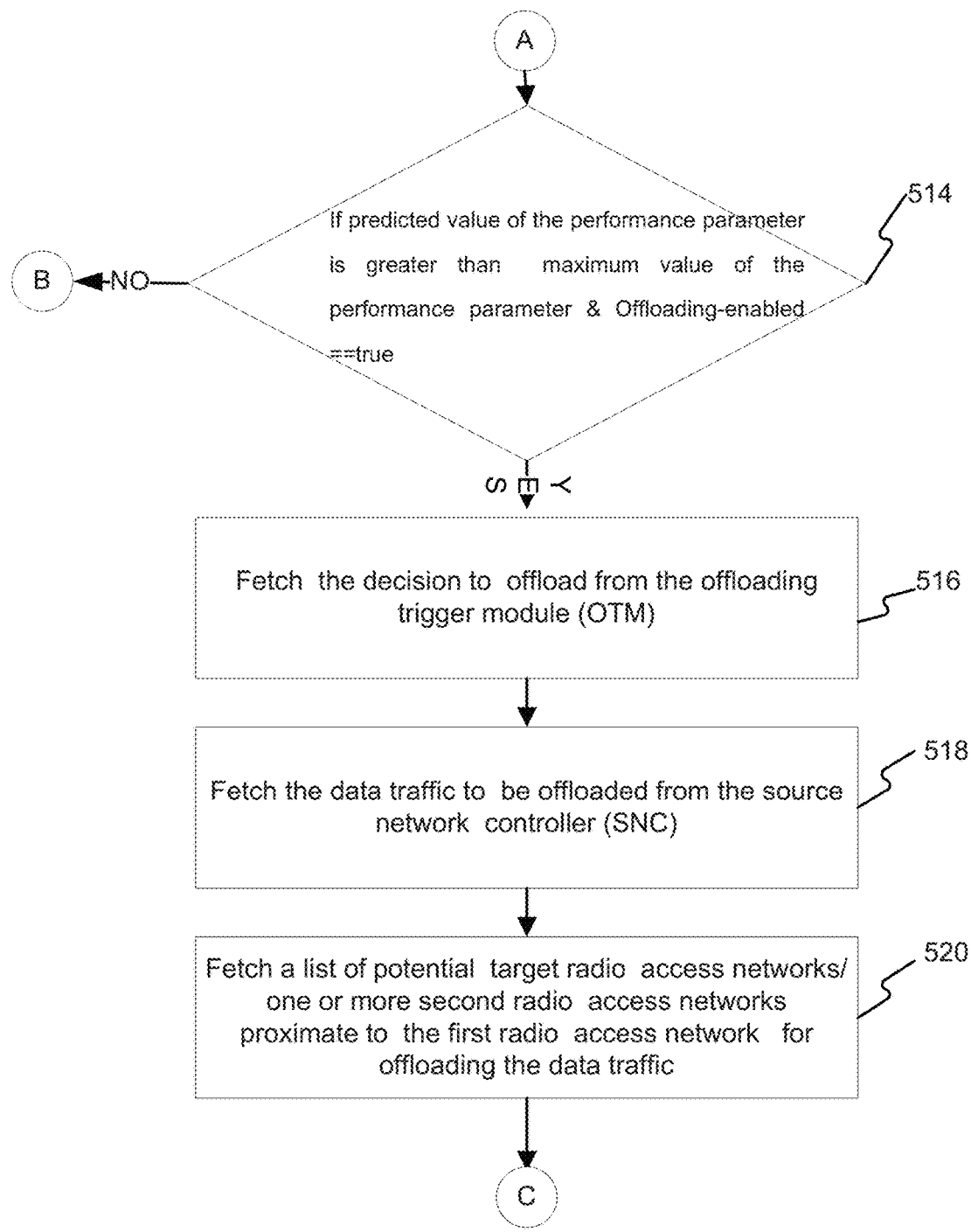

With reference to FIG. 5B, at step 514, compare the $v(t)_{predicted}$ with the maximum threshold $\Psi_{MAX}$. If the $v(t)_{predicted}$ is greater than $\Psi_{MAX}$ & offloading-enabled=true, offload=true else offload=false. In case, the offload=true, the method jumps to step 516 where the TNSM 150 may fetch the decision to offload from the OTM 148. In case of false outcome, the method goes back to step 528.

At step 518, the TNSM 150 fetches the data traffic to be offloaded from the SNC 130.

At step 520, the TNSM 150 may fetch a list of one or more second radio access networks 112 proximate to the first radio access network 110 for offloading the data traffic. These one or more second radio access networks may also be referred to as potential target radio access networks. The list of the one or more second radio access networks may be obtained from the NFDM 134.

Figure 5C:
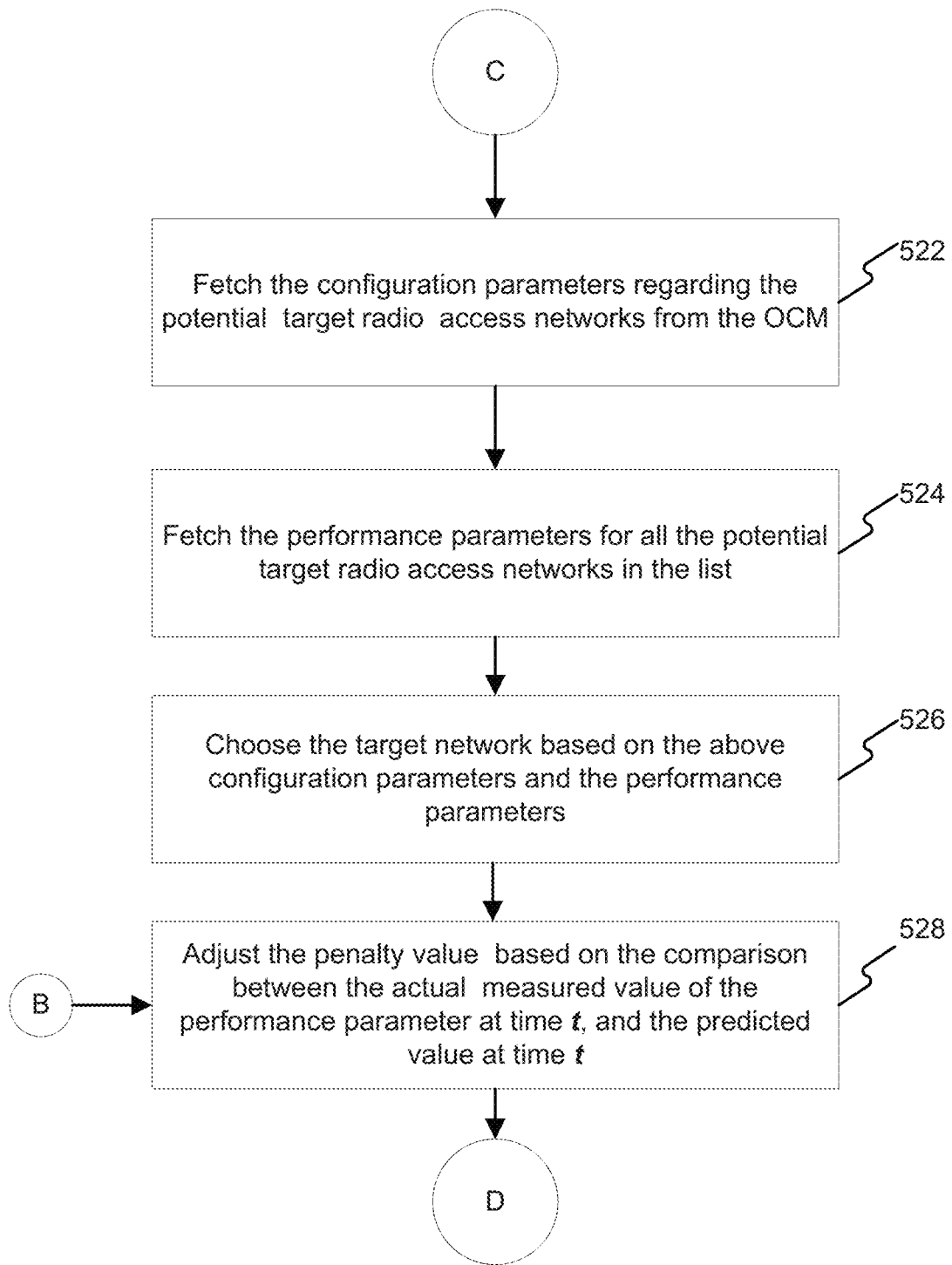

With reference to FIG. 5C, at step 522, fetch the configuration parameters from the OCM 142. The configuration parameters may be fetched by the TNSM 150. Some of the exemplary configuration parameters are as follows:
 MINIMUM PERCIEVED SIGNAL STREGTH BETWEEN USER AND TARGET NETWORK, the target network being one of the one or more second radio access networks 112—β_MIN
 MAX INTERFERENCE/NOISE POWER LEVEL OF TARGET NETWORK—α_MAX At step 524, fetch the performance parameters for all the potential target radio access networks in the list. The performance parameters may be fetched by the TNSM 150. Some of the exemplary performance parameters are as follows:
 a. User Perceived signal strength of the target network
 b. Interference/Nose power level for each of the target network At step 526, choose the target network based on the above configuration parameters and the performance parameters.

In one implementation, the potential target radio access networks list may be sorted in descending order with respect to user perceived signal strength of the potential target radio access networks and chooses the target network with best perceived signal strength. That is signal strength greater than $\beta_{MIN}$.

In case of multiple potential target radio access networks having better perceived signal strength the Interference/Nose power level for each of the potential target radio access networks may be determined.

Figure 5D:
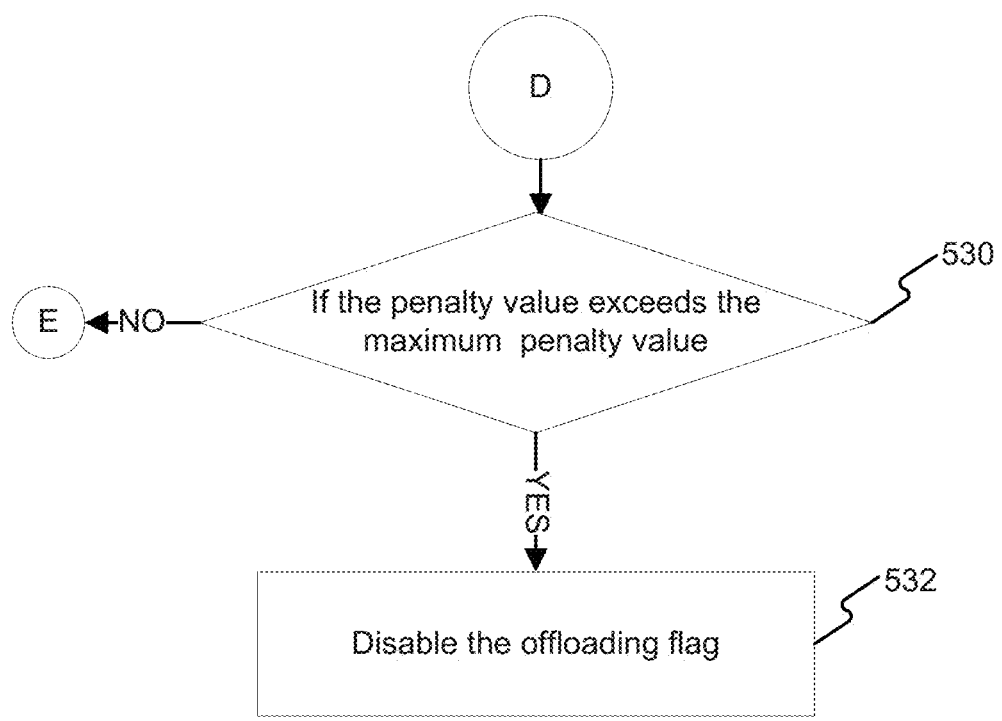

The target network with least Interference/Noise power level is chosen. That is less than $\alpha_{MAX}$. The data traffic is then offloaded to the target network At step 528, adjust the penalty value ρ based on the comparison between the actual measured value $v(t)_{measured}$ of the performance parameter at time t, and the predicted value. The adjustment of the penalty is performed as follows:

if $-\Delta_{Tolerance} + v(t)_{measured} < v(t)_{predicted} \leq \Delta_{Tolerance} + v(t)_{measured}$
then,
    $\rho \leftarrow \rho + 1$
else
    $\rho \leftarrow \rho - 1$ With reference to FIG. 5D, at step 530, based on the comparison of the penalty value with maximum penalty value, the offloading flag is enabled or disabled. If the penalty value exceeds the maximum penalty value, the offloading flag is disabled and the offloading of the traffic from the first radio access network 110 to the second radio access network 112 is stopped (step 532). After a predetermined time interval has elapsed, the past statistics of performance of the first radio access network may be collected. If the penalty value does not exceed the maximum penalty value, the offloading flag remains enabled and the method goes to step 510. The comparison is performed as follows:

if $\rho + \pi_{HYST} \leq \rho_{MAX}$ offloading-enabled=true else if $\rho - \pi_{HYST} > \rho_{MAX}$ offloading-enabled=false $\pi_{HYST}$ is a hysteresis parameter. It is a type of cushion against temporary changes in the value of the penalty value $\rho$. For example, if penalty threshold is 10 and hyst is 1 and actual penalty value is 12 then 12+1 is not less than 10 but 12-1 is greater than 10 implies offloading_enabled=true As noted above, the monitoring of the performance parameters is done one after the other. First the performance parameters of the first radio access network 110 are monitored. Thereafter, the performance parameters of the one or more second radio access networks 112 are monitored. However, it would be apparent to a person skilled in the art that the simultaneous monitoring of the performance parameters of the first radio access network 110 and one or more second radio access networks 112 may be performed.

Exemplary Computer System

FIG. 6 is a block diagram of an exemplary computer system 601 for implementing embodiments consistent with the present disclosure. Variations of computer system 601 may be used for implementing any of the devices and/or device components presented in this disclosure. Computer system 601 may comprise a central processing unit (CPU or processor) 602. Processor 602 may comprise at least one data processor for executing program components for executing user- or system-generated requests. A user may include a person using a device such as such as those included in this disclosure or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 518-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc.

The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for offloading one or more data packets, the method comprising:
   predicting, by the one or more hardware processors at a first time point, values of one or more first performance parameters of a first radio access network at a second time point, the prediction being based on past actual values of the one or more performance parameters;
   triggering, by the one or more hardware processors before the second time point, offloading of one or more data packets from the first radio access network to a second radio access network, based on a determination that the predicted values exceed one or more first predetermined thresholds and that the offloading from the first radio access network to the second radio access network is enabled;
   obtaining, by the one or more hardware processors, actual values of the one or more performance parameters at the second time point;
   comparing, by the one or more hardware processors, the actual values against the predicted values;
   adjusting, by the one or more hardware processors, a penalty parameter based on a result of the comparison;
   responsive to determining that the adjusted penalty parameter exceeds a second predetermined threshold, disabling, by the one or more hardware processors, the offloading from the first radio access network to the second radio access network.

2. The method of claim 1, wherein the adjusting a penalty parameter based on a result of the comparison further comprises:
   determining a difference between the actual values of the one or more performance parameters and the predicted values of the one or more performance parameters; and
   incrementing the penalty parameter responsive to determining the difference lies within a range defined by first difference threshold and a second difference threshold.

3. The method of claim 2, further comprising decrementing the penalty parameter responsive to determining that the difference lies outside the range.

4. The method of claim 2, wherein the first difference threshold and the second difference threshold are calculated using the measured actual values of the one or more first performance parameters.

5. The method of claim 1, further comprising:
   responsive to determining that the adjusted penalty parameter does not exceed a third predetermined threshold, enabling the offloading from the first radio access network to the second radio access network;
   wherein the second predetermined threshold exceeds the third predetermined threshold.

6. The method of claim 1, wherein triggering the offloading of the one or more data packets from the first radio access network to the second radio access network comprises:
   fetching the one or more data packets to be offloaded from the first radio access network;
   fetching one or more potential target radio access networks proximate to the first radio access network, the second radio access network being one of the one or more potential target radio access networks;
   monitoring one or more second performance parameters of the one or more potential target radio access networks;
   selecting the second radio access network based on the monitored one or more second performance parameters; and
   offloading the fetched one or more data packets to the second radio access network.

7. The method of claim 1, wherein the one or more first performance parameters of the first radio access network comprise at least one of a physical resource block utilization, an interference/noise power level, average inter scheduling interval, or a packet discard rate.

8. The method of claim 6, wherein the one or more second performance parameters of the one or more potential target radio access networks comprise at least one of a user perceived signal strength or an interference/noise power level.

9. The method claim 1 wherein the first radio access network is long term evolution 3G network and wherein the second radio access network is Wi-Fi enabled network.

10. A system for offloading one or more data packets, the system comprising:
   one or more hardware processors; and
   a memory storing instructions that, when executed by the one or more hardware processors, cause the one or more hardware processors to perform operations comprising:
      predicting, by the one or more hardware processors at a first time point, values of one or more first performance parameters of a first radio access network at a second time point, the prediction being based on past actual values of the one or more performance parameters;
      triggering, by the one or more hardware processors before the second time point, offloading of the one or more data packets from the first radio access network to a second radio access network, based on a determination that the predicted values exceed one or more first predetermined thresholds and that the offloading from the first radio access network to the second radio access network is enabled;
      obtaining, by the one or more hardware processors, actual values of the one or more performance parameters at the second time point;
      comparing, by the one or more hardware processors, the actual values against the predicted values;
      adjusting, by the one or more hardware processors, a penalty parameter based on a result of the comparison;
      responsive to determining that the adjusted penalty parameter exceeds a second predetermined threshold, disabling, by the one or more hardware processors, the offloading from the first radio access network to the second radio access network.

11. The system of claim 10, wherein the memory stores instructions that, when executed by the one or more hardware processors, cause the one or more hardware processors to further perform operations comprising:
   determining a difference between the actual values of the one or more performance parameters and the predicted values of the one or more performance parameters; and
   incrementing the penalty parameter responsive to determining that the difference lies within a range defined by first difference threshold and a second difference threshold.

12. The system of claim 11, wherein the memory stores instructions that, when executed by the one or more hardware processors, cause the one or more hardware processors to further perform operations comprising:
   decrementing the penalty parameter responsive to determining that the difference lies outside the range.

13. The system of claim 11, wherein the first difference threshold and the second difference threshold are calculated using the measured actual values of the one or more first performance parameters.

14. The system of claim 10, wherein the memory stores instructions that, when executed by the one or more hardware processors, cause the one or more hardware processors to further perform operations comprising:
   responsive to determining that the adjusted penalty parameter does not exceed a third predetermined threshold, enabling the offloading from the first radio access network to the second radio access network;
   wherein the second predetermined threshold exceeds the third predetermined threshold.

15. The system of claim 10, wherein triggering the offloading of the one or more data packets from the first radio access network to the second radio access network comprises:
   fetching the one or more data packets to be offloaded from the first radio access network;
   fetching one or more potential target radio access networks proximate to the first radio access network, the second radio access network being one of the one or more potential target radio access networks;
   monitoring one or more second performance parameters of the one or more potential target radio access networks;

selecting the second radio access network based on the monitored one or more second performance parameters; and offloading the fetched one or more data packets to the second radio access network.

16. The system of claim 10, wherein the one or more first performance parameters of the first radio access network comprise at least one of a physical resource block utilization, an interference/noise power level, average inter scheduling interval, or a packet discard rate.

17. The system of claim 15, wherein the one or more second performance parameters of the one or more potential target radio access networks comprise at least one of a user perceived signal strength or an interference/noise power level.

18. The system of claim 10, wherein the first radio access network is long term evolution 3G network and wherein the second radio access network is Wi-Fi enabled network.

19. A non-transitory computer-readable medium storing instructions for offloading one or more data packets that, when executed by a processor, cause the processor to perform operations comprising:

predicting, by the one or more hardware processors at a first time point, values of one or more first performance parameters of a first radio access network at a second time point, the prediction being based on past actual values of the one or more performance parameters;

triggering, by the one or more hardware processors before the second time point, offloading of one or more data packets from the first radio access network to a second radio access network, based on a determination that the predicted values exceed one or more first predetermined thresholds and that the offloading from the first radio access network to the second radio access network is enabled;

obtaining, by the one or more hardware processors, actual values of the one or more performance parameters at the second time point;

comparing, by the one or more hardware processors, the actual values against the predicted values;

adjusting, by the one or more hardware processors, a penalty parameter based on a result of the comparison;

responsive to determining that the adjusted penalty parameter exceeds a second predetermined threshold, disabling, by the one or more hardware processors, the offloading from the first radio access network to the second radio access network.

20. The non-transitory computer-readable medium of claim 19, wherein the non-transitory computer-readable medium stores instructions that, when executed by the processor, cause the processor to further perform operations comprising:

determining a difference between the actual values of the one or more performance parameters and the predicted values of the one or more performance parameters;

incrementing the penalty parameter responsive to determining that the difference lies within a range defined by first difference threshold and a second difference threshold.

21. The non-transitory computer-readable medium of claim 20, wherein the memory stores instructions that, when executed by the processor, cause the one or more processor to further perform operations comprising:

decrementing the penalty parameter responsive to determining that the difference lies outside the range.

22. The non-transitory computer-readable medium of claim 20, wherein the first difference threshold and the second difference threshold are calculated using the measured actual values of the one or more first performance parameters.

23. The non-transitory computer-readable medium of claim 19, wherein the memory stores instructions that, when executed by the processor, cause the processor to further perform operations comprising:

responsive to determining that the adjusted penalty parameter does not exceed a third predetermined threshold, enabling the offloading from the first radio access network to the second radio access network;

wherein the second predetermined threshold exceeds the third predetermined threshold.

24. The non-transitory computer-readable medium of claim 19, wherein triggering the offloading of the one or more data packets from the first radio access network to the second radio access network comprises:

fetching the one or more data packets to be offloaded from the first radio access network;

fetching one or more potential target radio access networks proximate to the first radio access network, the second radio access network being one of the one or more potential target radio access networks;

monitoring one or more second performance parameters of the one or more potential target radio access networks;

selecting the second radio access network based on the monitored one or more second performance parameters; and offloading the fetched one or more data packets to the second radio access network.

25. The method of claim 1, further comprising:

responsive to determining the adjusted penalty parameter exceeds a second predetermined threshold, restarting, by the one or more hardware processors, the monitoring of the first values of the one or more first performance parameters and the predicting of the second values of the one or more first performance parameters, after a predetermined time interval has elapsed.

* * * * *